United States Patent
Suzuki et al.

(10) Patent No.: US 8,069,338 B2
(45) Date of Patent: Nov. 29, 2011

(54) DATA PROCESSING DEVICE AND CONTROL METHOD FOR PREVENTING AN EXCEPTION CAUSED BY AN INSTRUCTION SENT TO A PERIPHERAL DEVICE BY A BRANCH SOURCE PROGRAM FROM OCCURRING DURING EXECUTION OF A BRANCH DESTINATION PROGRAM OR INTERRUPT PROGRAM

(75) Inventors: Hitoshi Suzuki, Kanagawa (JP); Yukihiko Akaike, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 434 days.

(21) Appl. No.: 12/292,259

(22) Filed: Nov. 14, 2008

(65) Prior Publication Data
US 2009/0144454 A1 Jun. 4, 2009

(30) Foreign Application Priority Data
Nov. 30, 2007 (JP) ................................ 2007-309902

(51) Int. Cl.
G06F 9/32 (2006.01)
G06F 15/16 (2006.01)
G06F 9/48 (2006.01)
(52) U.S. Cl. ............................ 712/233; 712/34; 712/244
(58) Field of Classification Search ......................... None
See application file for complete search history.

(56) References Cited

U.S. PATENT DOCUMENTS

| | | | | |
|---|---|---|---|---|
| 4,949,241 | A * | 8/1990 | Iwasaki et al. | 710/110 |
| 5,109,514 | A * | 4/1992 | Garner et al. | 710/260 |
| 5,257,216 | A * | 10/1993 | Sweedler | 708/498 |
| 5,307,301 | A * | 4/1994 | Sweedler | 708/508 |
| 5,341,482 | A * | 8/1994 | Cutler et al. | 712/244 |
| 5,375,212 | A * | 12/1994 | Saini | 712/244 |
| 5,559,977 | A * | 9/1996 | Avnon et al. | 712/244 |
| 5,884,062 | A * | 3/1999 | Wichman et al. | 712/218 |
| 5,898,864 | A * | 4/1999 | Golla et al. | 712/228 |
| 5,961,630 | A * | 10/1999 | Zaidi et al. | 712/200 |
| 6,910,122 | B1 * | 6/2005 | Bass et al. | 712/219 |
| 7,310,723 | B1 * | 12/2007 | Rozas et al. | 712/244 |

FOREIGN PATENT DOCUMENTS
JP 1-109466 4/1989

* cited by examiner

*Primary Examiner* — Keith Vicary
(74) *Attorney, Agent, or Firm* — McGinn Intellectual Property Law Group, PLLC

(57) ABSTRACT

A data processing device includes a program execution section to supply an operation direction signal to a peripheral device based on an executed program and execute a branch operation in response to a branch direction signal, and a branch wait operation section to receive the branch direction signal and a peripheral device status notification signal indicating whether an operation performed in the peripheral device is being executed. The branch wait operation section outputs an instruction issue stop signal directing waiting of the branch operation to the program execution section if the branch direction signal is input during a period when the peripheral device status notification signal is active indicating that the operation in the peripheral device is being executed.

20 Claims, 10 Drawing Sheets

DATA PROCESSING DEVICE AND CONTROL METHOD FOR PREVENTING AN EXCEPTION CAUSED BY AN INSTRUCTION SENT TO A PERIPHERAL DEVICE BY A BRANCH SOURCE PROGRAM FROM OCCURRING DURING EXECUTION OF A BRANCH DESTINATION PROGRAM OR INTERRUPT PROGRAM

BACKGROUND

1. Field of the Invention

The present invention relates to a data processing device and a control method of the data processing device. Particularly, the present invention relates to a data processing device including a program execution section that supplies an operation direction signal to a peripheral device based on an executed program and executes a branch operation in response to a branch direction signal, and a control method of the data processing device.

2. Description of Related Art

In a recent data processing device such as a microcomputer, program parallel processing is executed in order to improve processing performance. For example, the data processing device includes a program execution section that executes an instruction based on a program and a peripheral device (e.g. coprocessor) that operates based on operation direction from the program execution section. When an instruction to use the coprocessor in the program being executed in the program execution section occurs, the program execution section gives an operation direction to the coprocessor and executes the instruction subsequent to the operation direction. In such a configuration, the program execution section and the coprocessor can execute processing in parallel with each other. An example of the data processing device that performs such parallel processing is disclosed in Japanese Unexamined Patent Application Publication No. 1-109466 (Iwasaki et al.).

FIG. 8 is a block diagram of a data processing device 100 disclosed in Iwasaki et al. Referring to FIG. 8, the data processing device 100 includes a central processing unit (CPU) 101, a coprocessor 102, a main storage 103, an address bus 104 and a data bus 105. In the data processing device 100, the CPU 101, the coprocessor 102 and the main storage 103 are connected through the address bus 104 and the data bus 105. The address bus 104 is a bus to transfer an address indicating destination of data transmission and reception. The data bus 105 is a bus to transfer data to be transmitted and received. In the data processing device 100, the CPU 101 executes a program stored in the main storage 103. Further, the CPU 101 outputs an operation direction to the coprocessor 102 according to the program. The coprocessor 102 includes a status port 121, a command port 122, an operand port 123 and an execution unit 124. The status port 121 is a port that, when an exception occurs as a result of execution processing in the coprocessor 102, outputs the description of the exception to the CPU 101. The command port 122 is a port for the CPU 101 to write the description of the instruction to the coprocessor 102. The operand port 123 is a port that is used when it is necessary for the CPU 101 to supply operand data needed to the processing of the coprocessor 102 or when it is necessary to write data back from the coprocessor 102 to the CPU 101. The execution unit 124 executes the processing based on data supplied via the command port 122 and the operand port 123. Then, the execution unit 124 outputs CPEND signal, CPERR signal and BUSY signal to the CPU 101 according to the execution state of the processing.

FIG. 9 is a timing chart showing the operation of the data processing device 100. Referring to FIG. 9, when an instruction to be transferred to the coprocessor 102 occurs, the CPU 101 designates the command port 122 using the address bus 104 and transmits an operand code to the command port 122 through the data bus 105. Then, the coprocessor 102 activates the BUSY signal, receives the operand code transmitted from the CPU 101 and starts processing. Further, the coprocessor 102 notifies that it has received the operand code correctly to the CPU 101 by inactivating the CPERR signal. On the other hand, the CPU 101 continues to execute the next program processing after the issue of the instruction to the coprocessor 102 is completed. In this manner, in the data processing device 100, the CPU 101 continues the program processing after transferring the instruction to the coprocessor 102, thereby realizing parallel processing in the CPU 101 and the coprocessor 102.

The operation of the data processing device 100 in the event that an exception occurs in the processing being executed in the coprocessor 102 of the data processing device 100 is described hereinafter. As shown in FIG. 9, when an exception occurs in the processing being executed in the coprocessor 102, the coprocessor 102 becomes suspended with the exception pending in the status port 121. Even in such a case, when an instruction to be transferred to the coprocessor 102 occurs, the CPU 101 designates the command port 122 using the address bus 104 and transmits an operand code to the command port 122 through the data bus 105. Then, the coprocessor 102 activates the BUSY signal and receives the operand code transmitted from the CPU 101. However, because the exception has occurred in the previous processing, the coprocessor 102 keeps the CPERR signal active. Further, the CPU 101 reads that the CPEND signal output from the coprocessor 102 is inactive when transferring the operand code and thereby recognizes that the processing of the coprocessor 102 is not yet completed. Then, at the rising edge of the BUSY signal, the CPU 101 designates the status port 121 using the address bus 104 and reads the status information through the data bus 105. The CPU 101 thereby recognizes that the exception is occurring in the processing performed previously in the coprocessor 102 and executes exception handling on the previous processing.

SUMMARY

In the data processing device, a program to be executed may be changed to a program different from the program being executed by performing a branch operation. A program that has been executed before the branch operation is referred to as a branch source program, and a program that is newly executed after the branch operation is referred to as a branch destination program or an interrupt program. In the data processing device that performs such a branch operation, when an exception occurs related to an instruction to a peripheral device directed by the branch source program and an exception notification is received during execution of the branch destination program, the data processing device may wrongly recognize that an error is occurring in the branch destination program, which is actually operating normally.

Further, when the branch destination program being executed in the data processing device is operating in an interrupt disabled status called a critical section, a problem shown in the program processing flow in FIG. 10 occurs. In such a case, exception handling is performed after the critical section of the branch destination program. Further, the coprocessor is put into suspend mode upon occurrence of the exception. Therefore, when the branch destination program that is operating in the critical section intends to use the coprocessor that has notified the exception, the branch destination program cannot access the coprocessor correctly. As a result, the branch destination program may output an incorrect processing result. When the branch destination program outputs an incorrect processing result, data stored on the memory may be broken down due to the incorrect processing result. If the data is broken down, recovery of the data is difficult, and it is thus necessary to execute initialization such as resetting in order to recover the operation of the data processing device. As described above, if an exception that occurs in the peripheral device is notified during execution of the branch destination program or the interrupt program, the data processing device cannot correctly terminate the processing of the branch destination program or the interrupt program, or an error in the branch source program is propagated to the branch destination program or the interrupt program.

Because such a branch operation of a program is not taken into consideration in the exception notification performed in the data processing device 100 described in Iwasaki et al., the above problem occurs in the data processing device 100. In sum, the present inventors have found a problem that the data processing device 100 cannot maintain the reliability related to the branch operation due to a relationship between the branch operation of a program and the exception handling occurring concurrently.

An exemplary aspect of an embodiment of the present invention is a data processing device including a program execution section to supply an operation direction signal to a peripheral device based on an executed program and execute a branch operation in response to a branch direction signal, and a branch wait operation section to receive the branch direction signal and a peripheral device status notification signal indicating whether an operation performed in the peripheral device is being executed, wherein the branch wait operation section outputs an instruction issue stop signal directing waiting of the branch operation to the program execution section if the branch direction signal is input during a period when the peripheral device status notification signal is active indicating that the operation in the peripheral device is being executed.

Another exemplary aspect of an embodiment of the present invention is a control method of a data processing device to supply an operation direction signal to a peripheral device based on an executed program and execute a branch operation in response to a branch direction signal, the method including receiving the branch direction signal and a peripheral device status notification signal indicating whether an operation performed in the peripheral device is being executed, and waiting to execute the branch operation if the branch direction signal is input during a period when the peripheral device status notification signal is active indicating that the operation in the peripheral device is being executed.

In the data processing device and the control method of the data processing device according to the exemplary embodiment of the present invention, even when a branch operation occurs while the peripheral device is executing processing, the branch operation waits to be executed until the processing in the peripheral device is completed. Thus, an exception is not notified after the branch operation in the data processing device and the control method thereof according to the exemplary embodiment of the present invention. Therefore, the data processing device and the control method thereof according to the exemplary embodiment of the present invention prevents a malfunction from occurring in a branch destination program or an interrupt program due to an error in a branch source program.

A data processing device and a control method of the same according to the exemplary embodiment of the present invention can improve the reliability related to the branch operation of the data processing device.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
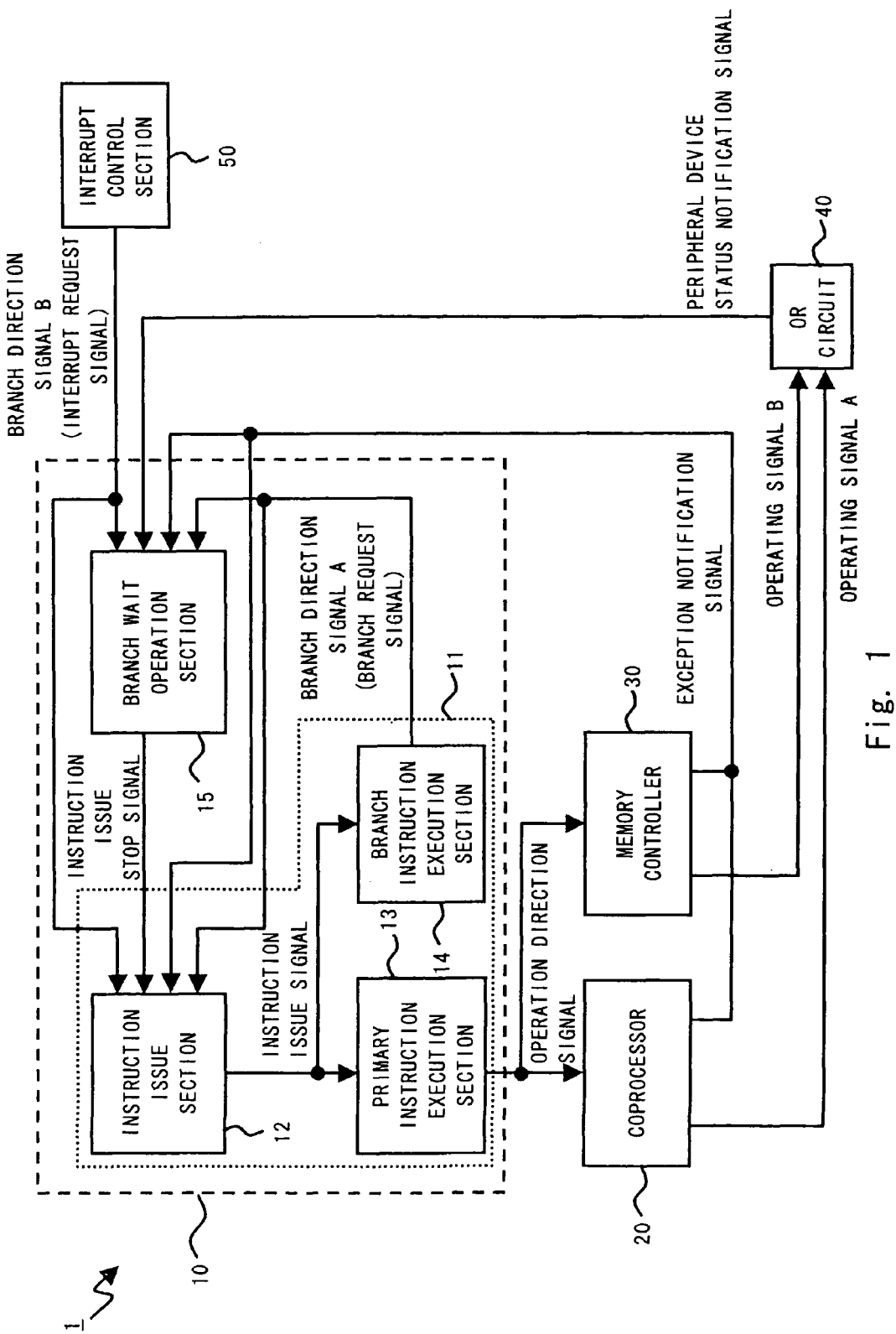
FIG. 1 is a block diagram of a data processing device according to a first exemplary embodiment.

An exemplary embodiment of the present invention is described hereinafter with reference to the drawings. FIG. 1 is a block diagram of a data processing device 1 according to the exemplary embodiment. Referring to FIG. 1, the data processing device 1 includes a CPU 10, a coprocessor 20, a memory controller 30, an OR circuit 40 and an interrupt control section 50. The following description is based on the assumption that the CPU 10, the coprocessor 20, the memory controller 30, the OR circuit 40 and the interrupt control section 50 are formed on separate semiconductor substrates. However, the CPU 10, the coprocessor 20, the memory controller 30, the OR circuit 40 and the interrupt control section 50 may be formed on one semiconductor substrate in the exemplary embodiment. Thus, the present invention is applicable to the case where any of the CPU 10, the coprocessor 20, the memory controller 30, the OR circuit 40 and the interrupt control section 50 are formed in combination on one semiconductor substrate. Further, although the coprocessor 20 and the memory controller 30 are used as peripheral devices in the following description, the peripheral device is not limited thereto.

The CPU 10 reads a program from memory or storage (not shown) and executes an instruction based on the read program. The CPU 10 includes a program execution section 11 and a branch wait operation section 15. The program execution section 11 includes an instruction issue section 12, a primary instruction execution section 13, and a branch instruction execution section 14. The instruction issue section 12 selects an instruction to be executed next based on the program and issues the selected instruction as an instruction issue signal to the primary instruction execution section 13 and the branch instruction execution section 14. Further, the instruction issue section 12 receives a branch direction signal A (e.g. a branch request signal), a branch direction signal B (e.g. an interrupt request signal) or a system call and performs a branch operation that changes a program to be executed based on the branch direction signal A or the branch direction signal B. The instruction issue section 12 also receives an exception notification signal and an instruction issue stop signal. If the exception notification signal is input, the instruction issue section 12 performs exception handling on the processing that has notified the exception. Further, if the instruction issue stop signal is input, the instruction issue section 12 waits to issue an instruction based on the instruction issue stop signal. Although the system call is not described below, the system call is one of branch instructions, which is generated when the program being executed in the program execution section 11 calls the function of a control program that is commonly used in a plurality of programs such as an operating system (OS).

The primary instruction execution section 13 executes instructions other than a branch instruction, issued by the instruction issue section 12. Further, the primary instruction execution section 13 outputs an operation direction signal that gives an operation direction to the coprocessor 20 and the memory controller 30 according to the kind of an instruction. The branch instruction execution section 14 outputs a branch request signal that notifies the address of a branch destination program and execution of a branch instruction when an instruction output from the instruction issue section 12 is the branch instruction. The branch request signal is transmitted to the instruction issue section 12 and the branch wait operation section 15.

The branch wait operation section 15 receives a branch direction signal, a peripheral device status notification signal indicating whether an operation performed in a peripheral device is being executed, and an exception notification signal. When the branch direction signal is input during a peripheral device processing period when the peripheral device status notification signal indicates that the operation in the peripheral device is being executed, the branch wait operation section 15 outputs an instruction issue stop signal that directs waiting of the branch operation to the program execution section 11. The branch direction signal involves a branch request signal output from the branch instruction execution section 14 and an interrupt request signal output from the interrupt control section 50. In the following description, the state where the instruction issue stop signal directs waiting of the branch operation is an active state of the instruction issue stop signal, and the state where the instruction issue stop signal directs release of waiting of the branch operation is an inactive state of the instruction issue stop signal.

The coprocessor 20 performs processing different from the CPU 10 based on the operation direction signal that is output from the primary instruction execution section 13. For example, the coprocessor 20 performs floating-point arithmetic. Then, the coprocessor 20 outputs an operating signal A that is active during execution of processing. Further, when an exception occurs in the processing executed therein, the coprocessor 20 notifies the CPU 10 of the occurrence of the exception by activating the exception notification signal.

The memory controller 30 writes data to memory (not shown) or reads data from the memory based on the operation direction signal that is output from the primary instruction execution section 13. Then, the memory controller 30 outputs an operating signal B that is active during execution of processing. Further, when an exception occurs in the processing executed therein, the memory controller 30 notifies the CPU 10 of the occurrence of the exception by activating the exception notification signal.

The OR circuit 40 receives the operating signals A and B and outputs a peripheral device status notification signal that is active when at least one of the operating signals A and B is active. The peripheral device status notification signal is input to the branch wait operation section 15 of the CPU 10. The interrupt control section 50 outputs an interrupt request signal to be supplied to the CPU 10 based on an interrupt request signal that is output from another peripheral device (not shown).

The operation of the data processing device 1 according to the exemplary embodiment is described hereinafter. The case where the program execution section 11 performs the branch operation based on the branch direction signal and changes a program to be executed is described below. Although the case where the branch operation is performed based on the branch request signal, which is one of the branch direction signal, is described below, the operation is substantially the same in the case where the branch operation is performed based on the interrupt request signal. At the change of the program by the branch operation, a program that has been executed before the branch operation is referred to as a branch source program, and a program that is executed after the branch operation is referred to as a branch destination program.

Figure 2:
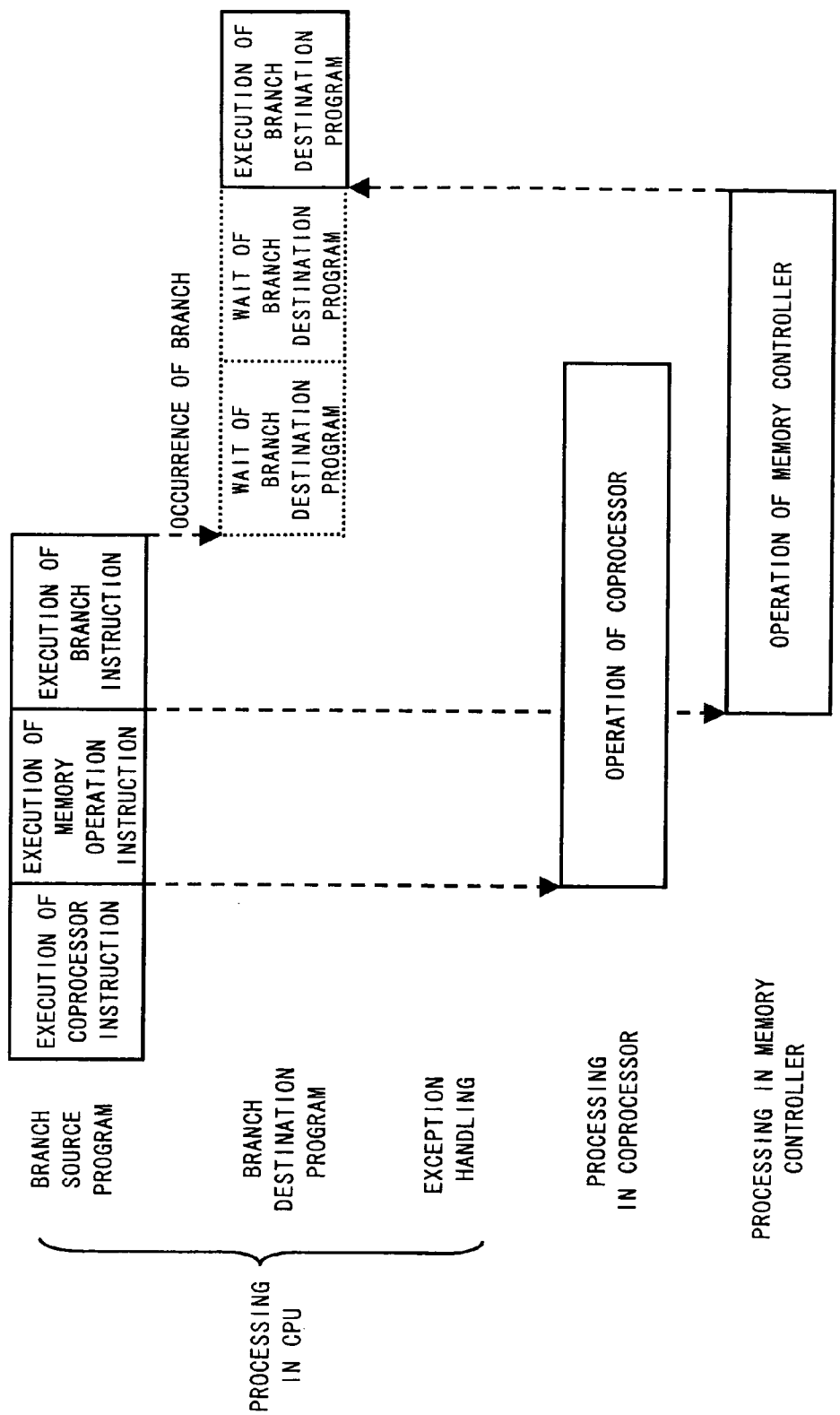
FIG. 2 is a program processing flow related to a first operation example in the data processing device according to the first exemplary embodiment.

FIG. 2 shows a program processing flow in the data processing device 1 in the case where the branch operation is performed in response to the branch request signal, as a first operation example of the data processing device 1. As shown in FIG. 2, in the data processing device 1, when a coprocessor instruction is issued based on a branch source program being processed in the program execution section 11, an operation direction is given to the coprocessor 20. The coprocessor 20 starts operating based on the operation direction. At this time, the branch source program is being processed in the program execution section 11 in parallel with the processing being performed in the coprocessor 20, and when a memory operation instruction is issued in the branch source program, an operation direction is given to the memory controller 30. The memory controller 30 starts operating based on the operation direction. At this time, the branch source program is being processed in the program execution section 11 in parallel with the processing being performed in the coprocessor 20, and a branch instruction subsequent to the memory operation instruction is executed in the program execution section 11.

Based on the branch instruction, the branch instruction execution section 14 outputs a branch request signal. The branch request signal is supplied to the instruction issue section 12, and the instruction issue section 12 prepares to issue an instruction of the branch destination program based on the branch request signal. However, because the branch wait operation section 15 outputs an active instruction issue stop signal to the instruction issue section 12 when the branch request signal is generated during the period when the coprocessor 20 or the memory controller 30 is operating, the instruction issue section 12 waits to issue the instruction based on the branch destination program. Then, because the instruction issue stop signal becomes inactive when the operation of the coprocessor 20 or the memory controller 30 is completed, the instruction issue section 12 issues the prepared instruction of the branch destination program in response thereto.

Figure 3:
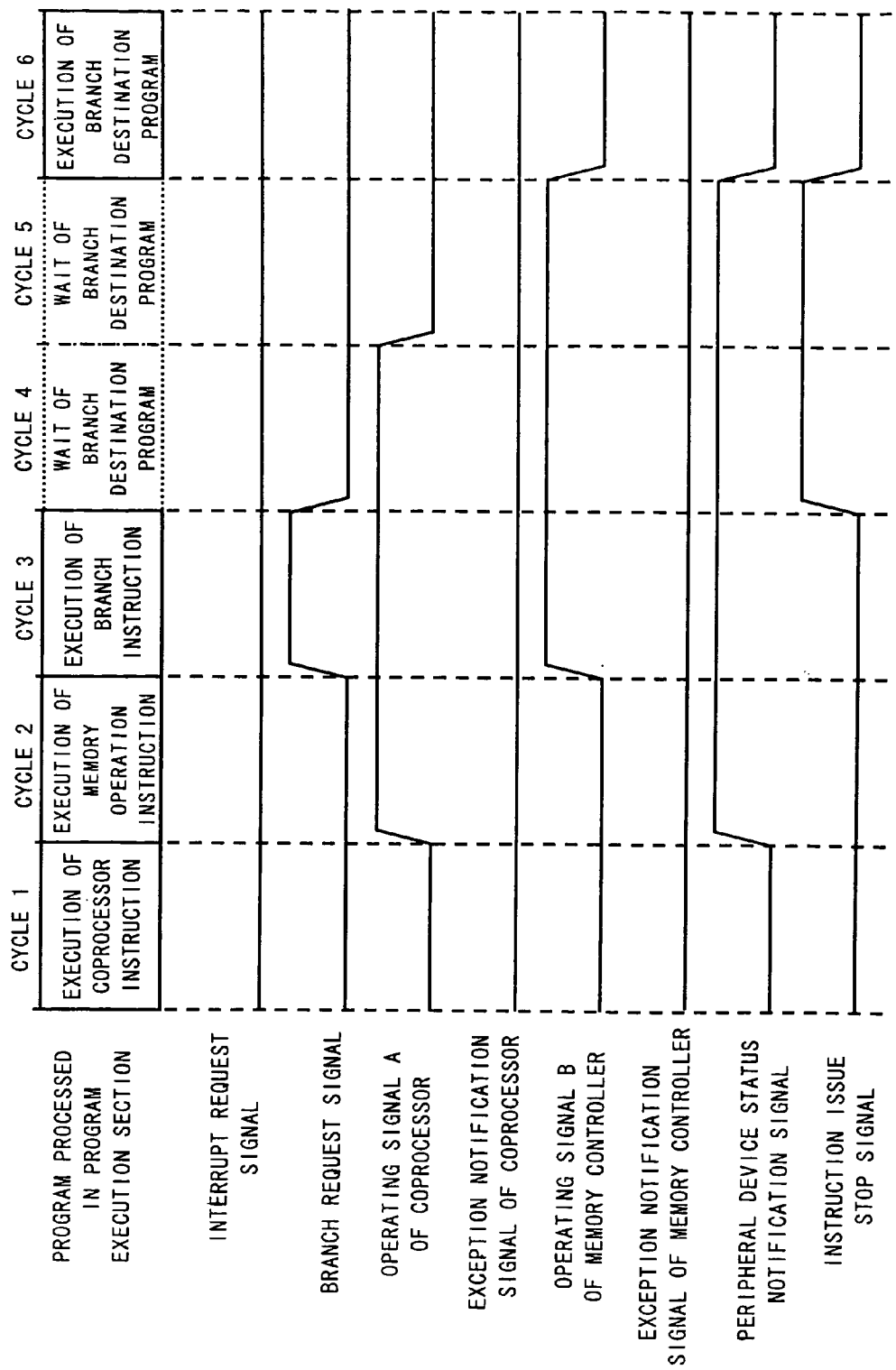
FIG. 3 is a timing chart showing an operation related to the first operation example in the data processing device according to the first exemplary embodiment.

FIG. 3 shows a timing chart showing the operation of the data processing device 1 in the first operation example in order to describe the processing flow of the first operation example in further detail. In FIG. 3, units of time of the instruction processing in the program executed in the data processing device 1 are shown by cycles.

Referring to FIG. 3, when the coprocessor instruction is executed in the program execution section 11 in the cycle 1, the operation of the coprocessor 20 is started in the cycle 2, and the operating signal A of the coprocessor 20 changes from inactive to active. In the example of FIG. 3, the operation of the coprocessor 20 continues until the cycle 4. Thus, the operating signal A of the coprocessor 20 stays active during the period from the cycle 2 to the cycle 4. In the first operation example, an exception does not occur in the coprocessor 20, and therefore the exception notification signal of the coprocessor 20 remains inactive.

Next, when the memory operation instruction is executed in the program execution section 11 in the cycle 2, the operation of the memory controller 30 is started in the cycle 3, and the operating signal B of the memory controller 30 changes from inactive to active. In the example of FIG. 3, the operation of the memory controller 30 continues until the cycle 5. Thus, the operating signal B of the memory controller 30 stays active during the period from the cycle 3 to the cycle 5. In the first operation example, an exception does not occur in the memory controller 30, and therefore the exception notification signal of the memory controller 30 remains inactive.

Then, the branch instruction is executed in the program execution section 11 in the cycle 3. By the execution of the branch instruction, the branch request signal changes from inactive to active in the cycle 3. Further, upon the execution of the branch instruction, the instruction issue section 12 prepares to issue an instruction of the branch destination program so as to issue the instruction of the branch destination program in the cycle 4. At this time, because the peripheral device status notification signal is active based on the operating signals A and B during the period from the cycle 2 to the cycle 5, the branch wait operation section 15 changes the instruction issue stop signal from inactive to active in the cycle 4, 5. Thus, the instruction issue section 12 waits to issue the prepared instruction of the branch destination program in the cycle 4, 5.

After that, because the operation of the coprocessor 20 is completed in the cycle 4 and the operation of the memory controller 30 is completed in the cycle 5, the peripheral device status notification signal becomes inactive in the cycle 6. Accordingly, the instruction issue stop signal becomes inactive in the cycle 6. In response to the change of the instruction issue stop signal to the inactive state, the instruction issue section 12 issues the instruction of the branch destination program, and the program execution section 11 starts the operation based on the branch destination program.

Figure 4:
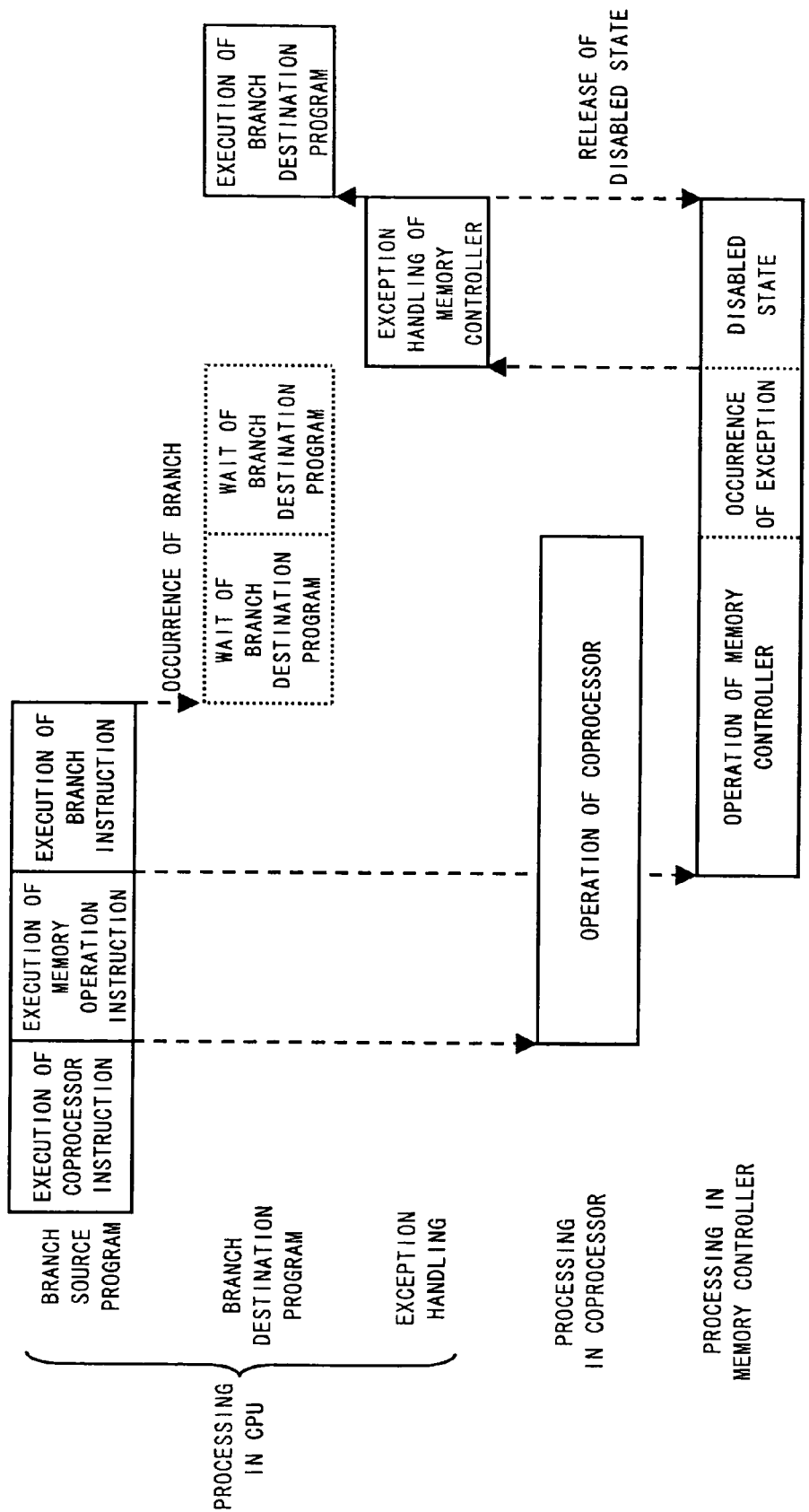
FIG. 4 is a program processing flow related to a second operation example in the data processing device according to the first exemplary embodiment.

In the first operation example shown in FIGS. 2 and 3, the case where the operation is completed without occurrence of an exception in any of the coprocessor 20 and the memory controller 30 is described. In the following, a second operation example in which an exception occurs in the memory controller 30 is described in contrast to the operation shown in FIGS. 2 and 3. FIG. 4 shows a program processing flow according to the second operation example.

As shown in FIG. 4, in the data processing device 1, when a coprocessor instruction is issued based on a branch source program being processed in the program execution section 11, an operation direction is given to the coprocessor 20. The coprocessor 20 starts operating based on the operation direction. At this time, the branch source program is being processed in the program execution section 11 in parallel with the processing being performed in the coprocessor 20, and when a memory operation instruction is issued in the branch source program, an operation direction is given to the memory controller 30. The memory controller 30 starts operating based on the operation direction. At this time, the branch source program is being processed in the program execution section 11 in parallel with the processing being performed in the coprocessor 20, and a branch instruction subsequent to the memory operation instruction is executed in the program execution section 11.

Based on the branch instruction, the branch instruction execution section 14 outputs a branch request signal. The branch request signal is supplied to the instruction issue section 12, and the instruction issue section 12 prepares to issue an instruction of the branch destination program based on the branch request signal. However, because the branch wait operation section 15 outputs an active instruction issue stop signal to the instruction issue section 12 when the branch request signal is generated during the period when the coprocessor 20 or the memory controller 30 is operating, the instruction issue section 12 waits to issue the instruction based on the branch destination program.

At this time, in the second operation example shown in FIG. 4, the coprocessor 20 ends the operation without an exception. On the other hand, the memory controller 30 ends the operation with an exception occurring, and it then becomes disabled in the state of holding the exception. Upon occurrence of such an exception, the data processing device 1 performs exception handling of the memory controller 30 before executing the branch destination program. After the exception handling is completed, the data processing device 1 releases the disabled state of the memory controller 30 and then starts the execution of the branch destination program. Alternatively, the branch destination program may be discarded. For example, if the branch destination program cannot be started normally as a result of the exception handling, it is preferred to discard the branch destination program.

Figure 5:
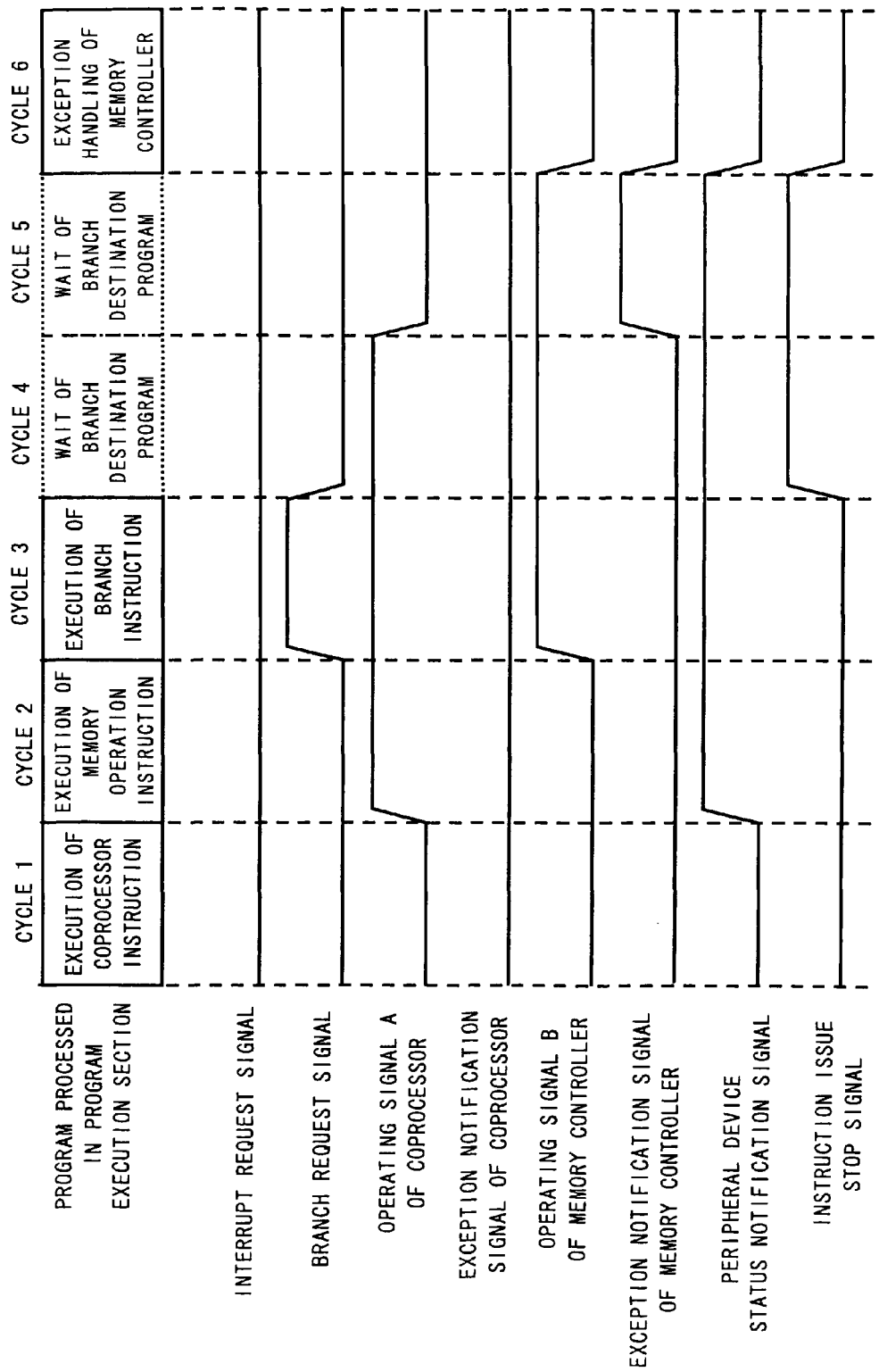
FIG. 5 is a timing chart showing an operation related to the second operation example in the data processing device according to the first exemplary embodiment.

FIG. 5 shows a timing chart showing the operation of the data processing device 1 in the second operation example in order to describe the processing flow of the second operation example in further detail. In FIG. 5, units of time of the instruction processing in the program executed in the data processing device 1 are shown by cycles.

Referring to FIG. 5, when the coprocessor instruction is executed in the program execution section 11 in the cycle 1, the operation of the coprocessor 20 is started in the cycle 2, and the operating signal A of the coprocessor 20 changes from inactive to active. In the example of FIG. 5, the operation of the coprocessor 20 continues until the cycle 4. Thus, the operating signal A of the coprocessor 20 stays active during the period from the cycle 2 to the cycle 4. In the second operation example, an exception does not occur in the coprocessor 20, and therefore the exception notification signal of the coprocessor 20 remains inactive.

Next, when the memory operation instruction is executed in the program execution section 11 in the cycle 2, the operation of the memory controller 30 is started in the cycle 3, and the operating signal B of the memory controller 30 changes from inactive to active. In the example of FIG. 5, the operation of the memory controller 30 continues until the cycle 5. Thus, the operating signal B of the memory controller 30 stays active during the period from the cycle 3 to the cycle 5. In the second operation example, an exception occurs in the memory controller 30 in the cycle 5, and therefore the exception notification signal of the memory controller 30 becomes active in the cycle 5.

Then, the branch instruction is executed in the program execution section 11 in the cycle 3. By the execution of the branch instruction, the branch request signal changes from inactive to active in the cycle 3. Further, upon the execution of the branch instruction, the instruction issue section 12 prepares to issue an instruction of the branch destination program so as to issue the instruction of the branch destination program in the cycle 4. At this time, because the peripheral device status notification signal is active based on the operating signals A and B during the period from the cycle 2 to the cycle 5, the branch wait operation section 15 changes the instruction issue stop signal from inactive to active in the cycle 4, 5. Thus, the instruction issue section 12 waits to issue the prepared instruction of the branch destination program in the cycle 4, 5. Further, in response to that the exception notification signal of the memory controller 30 becomes active in the cycle 5, the program execution section 11 prepares to perform exception handling on the memory controller 30 in the cycle 6. Thus, the processing performed in the cycle 6 is the exception handling on the memory controller 30.

After that, because the operation of the coprocessor 20 is completed in the cycle 4 and the operation of the memory controller 30 is completed in the cycle 5, the peripheral device status notification signal becomes inactive in the cycle 6. Accordingly, the instruction issue stop signal becomes inactive in the cycle 6. In response to the change of the instruction issue stop signal to the inactive state, the instruction issue section 12 issues an instruction to execute the exception handling on the memory controller 30 instead of the instruction of the branch destination program, and thereby the program execution section 11 executes the exception handling of the memory controller 30 before executing the branch destination program.

Figure 6:
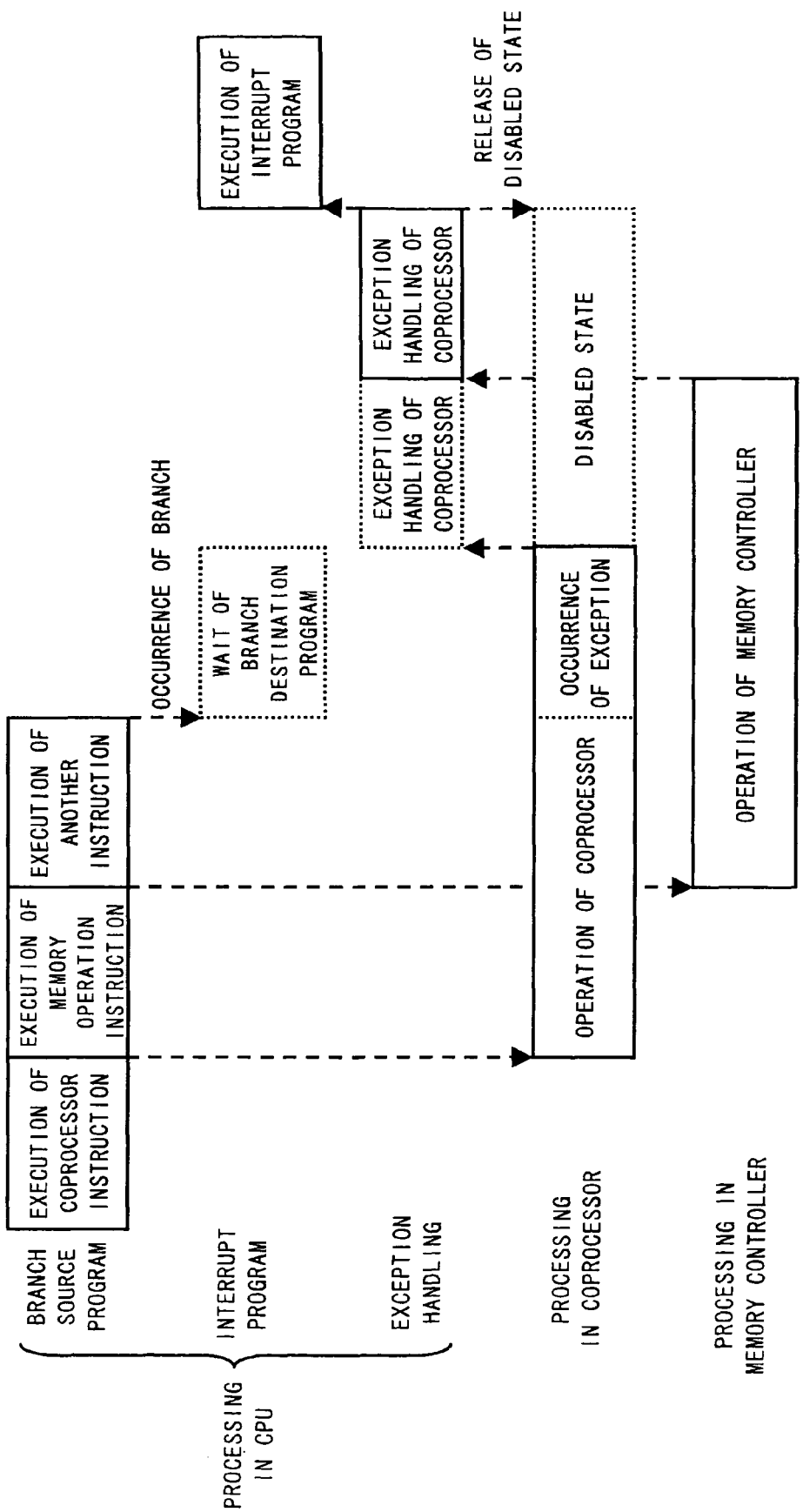
FIG. 6 is a program processing flow related to a third operation example in the data processing device according to the first exemplary embodiment.

In the first operation example shown in FIGS. 2 and 3, the case where the operation is completed without occurrence of an exception in any of the coprocessor 20 and the memory controller 30 is described. In the following, a third operation example where an exception occurs in the coprocessor 20 that completes the operation earlier than the memory controller 30 is described in contrast to the operation shown in FIGS. 2 and 3. FIG. 6 shows a program processing flow according to the third operation example.

As shown in FIG. 6, in the data processing device 1, when a coprocessor instruction is issued based on a branch source program being processed in the program execution section 11, an operation direction is given to the coprocessor 20. The coprocessor 20 starts operating based on the operation direction. At this time, the branch source program is being processed in the program execution section 11 in parallel with the processing being performed in the coprocessor 20, and when a memory operation instruction is issued in the branch source program, an operation direction is given to the memory controller 30. The memory controller 30 starts operating based on the operation direction. At this time, the branch source program is being processed in the program execution section 11 in parallel with the processing being performed in the coprocessor 20, and a branch instruction subsequent to the memory operation instruction is executed in the program execution section 11.

Based on the branch instruction, the branch instruction execution section 14 outputs a branch request signal. The branch request signal is supplied to the instruction issue section 12, and the instruction issue section 12 prepares to issue an instruction of the branch destination program based on the branch request signal. However, because the branch wait operation section 15 outputs an active instruction issue stop signal to the instruction issue section 12 when the branch request signal is generated during the period when the coprocessor 20 or the memory controller 30 is operating, the instruction issue section 12 waits to issue the instruction based on the branch destination program.

At this time, in the third operation example shown in FIG. 6, the memory controller 30 ends the operation without an exception. On the other hand, the coprocessor 20 ends the operation with an exception occurring, and it then becomes disabled in the state of holding the exception. Upon occurrence of such an exception, the data processing device 1 waits to perform exception handling on the coprocessor 20 until the operation of the memory controller 30 is completed. Then, after the operation of the memory controller 30 is completed, the data processing device 1 performs the exception handling on the coprocessor 20. After the exception handling is completed, the data processing device 1 releases the disabled state of the coprocessor 20, and then starts the execution of the branch destination program. Alternatively, the branch destination program may be discarded. For example, if the branch destination program cannot be started normally as a result of the exception handling, it is preferred to discard the branch destination program.

Figure 7:
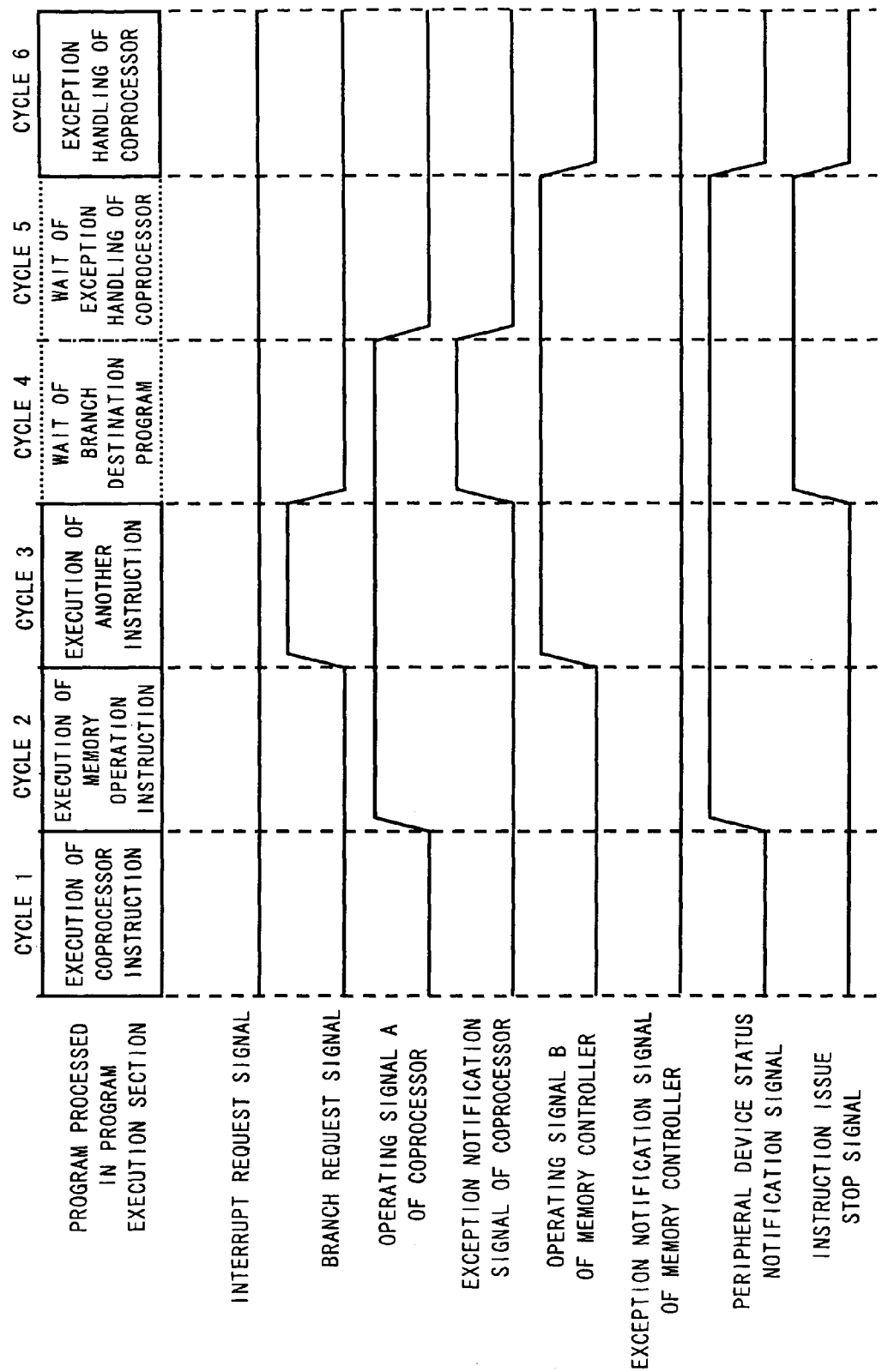
FIG. 7 is a timing chart showing an operation related to the third operation example in the data processing device according to the first exemplary embodiment.
Figure 8:
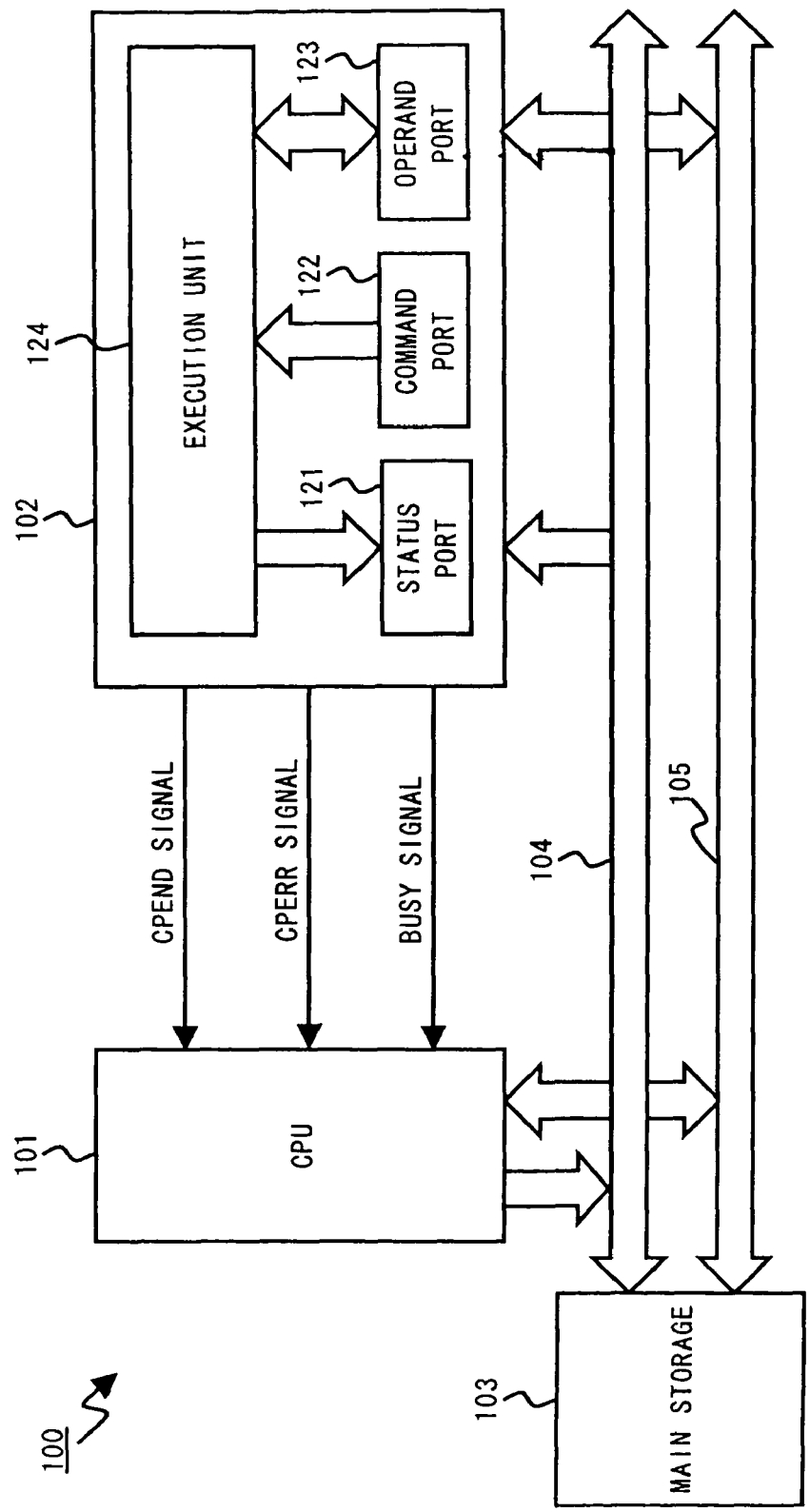
FIG. 8 is a block diagram of a data processing device according to a related art.
Figure 9:
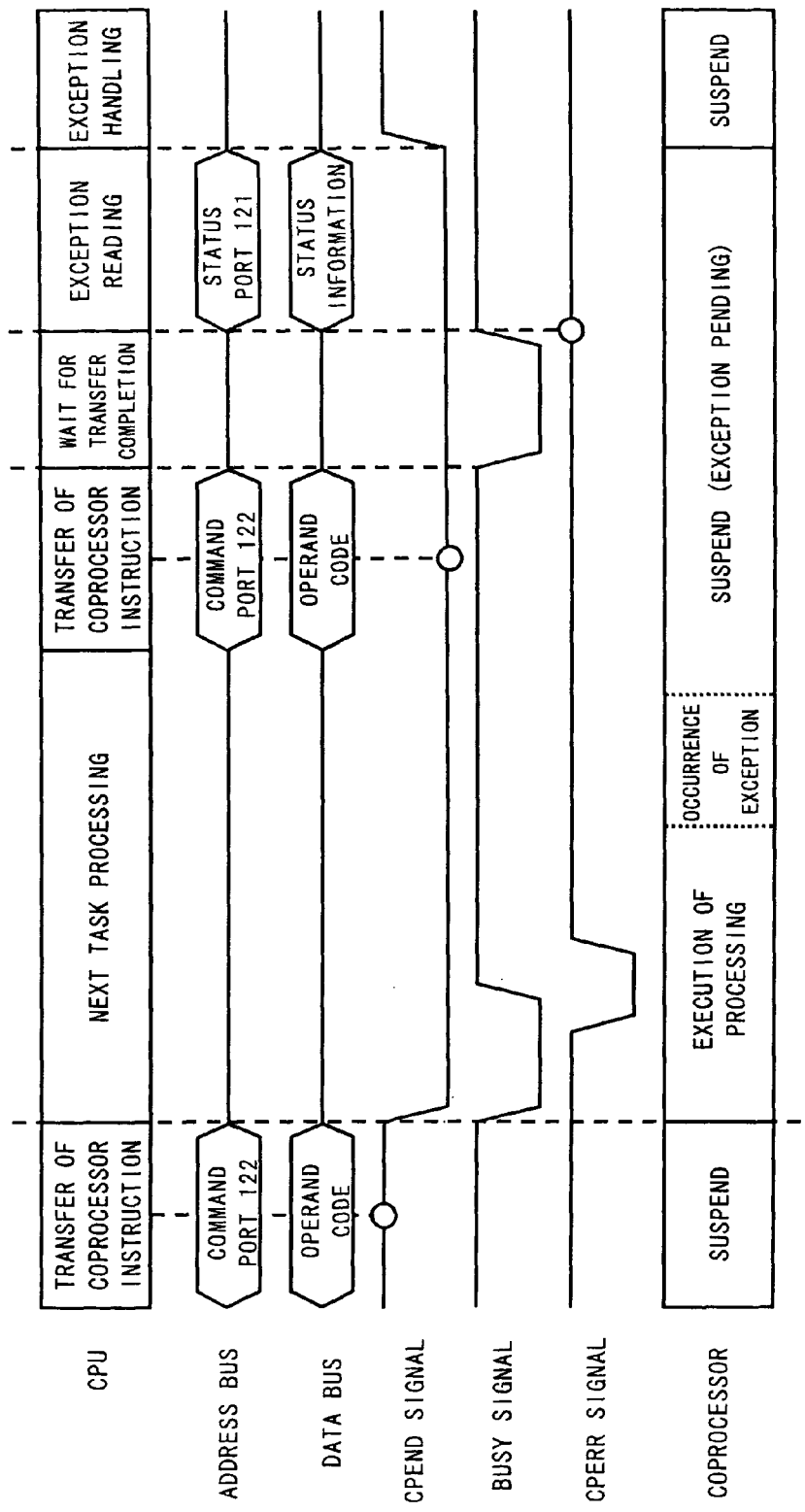
FIG. 9 is a timing chart showing an operation of a data processing device according to a related art.
Figure 10:
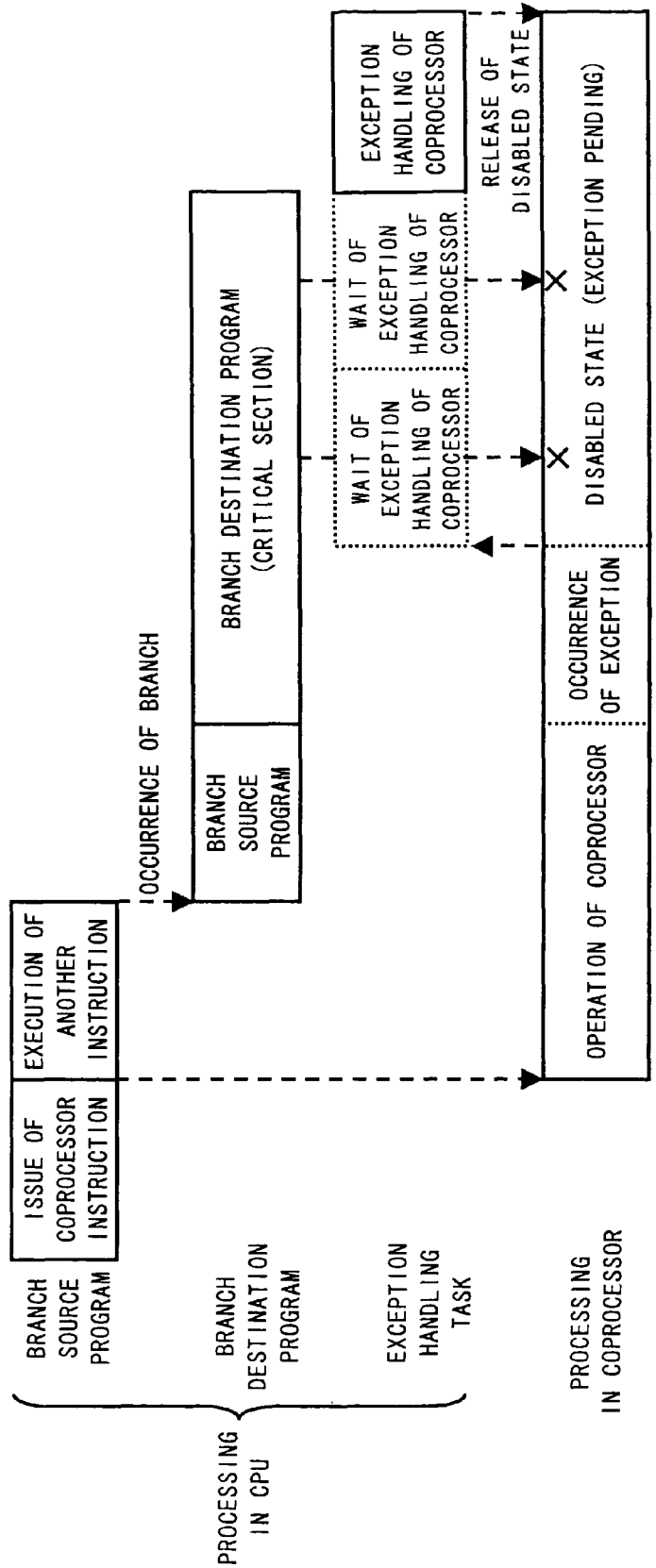
FIG. 10 is a program processing flow to describe an issue in a data processing device according to a related art.

FIG. 7 shows a timing chart showing the operation of the data processing device 1 in the third operation example in order to describe the processing flow of the third operation example in further detail. In FIG. 7, units of time of the instruction processing in the program executed in the data processing device 1 are shown by cycles.

Referring to FIG. 7, when the coprocessor instruction is executed in the program execution section 11 in the cycle 1, the operation of the coprocessor 20 is started in the cycle 2, and the operating signal A of the coprocessor 20 changes from inactive to active. In the example of FIG. 7, the operation of the coprocessor 20 continues until the cycle 4. Thus, the operating signal A of the coprocessor 20 stays active during the period from the cycle 2 to the cycle 4. In the third operation example, an exception occurs in the coprocessor 20 in the cycle 4, and therefore the exception notification signal of the coprocessor 20 becomes active in the cycle 4.

Next, when the memory operation instruction is executed in the program execution section 11 in the cycle 2, the operation of the memory controller 30 is started in the cycle 3, and the operating signal B of the memory controller 30 changes from inactive to active. In the example of FIG. 7, the operation of the memory controller 30 continues until the cycle 5. Thus, the operating signal B of the memory controller 30 stays active during the period from the cycle 3 to the cycle 5. In the third operation example, an exception does not occur in the memory controller 30, and therefore the exception notification signal of the memory controller 30 remains inactive.

Then, the branch instruction is executed in the program execution section 11 in the cycle 3. By the execution of the branch instruction, the branch request signal changes from inactive to active in the cycle 3. Further, upon the execution of the branch instruction, the instruction issue section 12 prepares to issue an instruction of the branch destination program so as to issue the instruction of the branch destination program in the cycle 4. At this time, because the peripheral device status notification signal is active based on the operating signals A and B during the period from the cycle 2 to the cycle 5, the branch wait operation section 15 changes the instruction issue stop signal from inactive to active in the cycle 4. Thus, the instruction issue section 12 waits to issue the prepared instruction of the branch destination program in the cycle 4. Further, in response to that the exception notification signal of the coprocessor 20 becomes active in the cycle 4, the program execution section 11 prepares to perform exception handling on the coprocessor 20 in the cycle 5. Thus, the exception handling on the coprocessor 20 is waited in the cycle 5.

After that, because the operation of the coprocessor 20 is completed in the cycle 4 and the operation of the memory controller 30 is completed in the cycle 5, the peripheral device status notification signal becomes inactive in the cycle 6. Accordingly, the instruction issue stop signal becomes inactive in the cycle 6. In response to the change of the instruction issue stop signal to the inactive state, the instruction issue section 12 issues an instruction to execute the exception handling on the coprocessor 20 instead of the instruction of the branch destination program, and thereby the program execution section 11 executes the exception handling of the coprocessor 20 before executing the branch destination As described in the foregoing, in the data processing device 1 according to the exemplary embodiment, the branch wait operation section 15 can cause the branch operation to be waited during operation of the peripheral device. Specifically, the data processing device 1 can process an exception that occurs in the peripheral device before the program execution section 11 executes the branch destination program by the branch operation. Therefore, an exception that occurs in the peripheral device based on an operation direction made by the branch source program is not notified to the program execution section 11 during execution of the branch destination program.

By such an operation, the data processing device 1 can process an exception occurring in the peripheral device based on the operation direction made by the branch source program in the branch source program having an error that causes the occurrence of the exception. Therefore, the data processing device 1 can appropriately process the exception occurring in the peripheral device based on the error that causes the occurrence of the exception.

Further, because the data processing device 1 executes the branch destination program after the operation of the branch source program ends normally and completely, it is possible to prevent an error in the branch source program from affecting the operation of the branch destination program. The program can be thereby recovered by re-execution of the branch source program or the like without performing initialization such as resetting of the data processing device 1. Because an error or a malfunction in the branch source program is not propagated to the branch destination program in the data processing device 1 according to the exemplary embodiment, it is possible to improve the reliability of the system as a whole.

The data processing device 1 according to the exemplary embodiment is particularly effective in a system in which a plurality of programs are provided by a variety of vendors. For example, it is effective in the system where a program 1 is a program designed for the data processing device 1 according to the exemplary embodiment, a program 2 is a program also used in another CPU, and the programs 1 and 2 are operated in the data processing device 1. In such a case, the program 2 is not designed in consideration of the operation of the program 1 regarding the branch operation. Thus, if an interrupt request is made from the program 2 during execution of the program 1, the program 2 is executed without waiting the completion of the program 1. Thus, an exception due to the program 1 may occur during execution of the program 2. If the programs 1 and 2 operate in this way, the program 2 may terminate abnormally in spite of being normal.

However, because the data processing device 1 according to the exemplary embodiment executes the program 2 after the operation of the program 1 is completed by means of the branch wait operation section 15, the above problem does not occur. Thus, the data processing device 1 according to the exemplary embodiment can improve the reliability of the system without depending on the kind of an executed program.

The present invention is not limited to the above-described exemplary embodiment, and various changes and modifications may be made without departing from the scope of the invention. For example, the configuration of the program execution section 11 is not limited to the one described in the above exemplary embodiment, and it may be altered as appropriate according to the system.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A data processing device comprising:
a program execution section to supply an operation direction signal to a peripheral device based on an executed program and execute a branch operation in response to a branch direction signal; and
a branch wait operation section to receive the branch direction signal and a peripheral device status notification signal indicating whether an operation performed in the peripheral device is being executed,
wherein the branch wait operation section outputs an instruction issue stop signal directing waiting of the branch operation to the program execution section when the branch direction signal is input during a period when the peripheral device status notification signal is active indicating that the operation in the peripheral device is being executed.

2. The data processing device according to claim 1, wherein
the program execution section executes the branch operation after waiting of the branch operation by the instruction issue stop signal is released.

3. The data processing device according to claim 1, wherein
when the program execution section receives an exception notification signal notifying occurrence of an exception of processing in the peripheral device during a period when the instruction issue stop signal directs waiting of the branch operation, the program execution section executes exception handling based on the exception notification signal before executing the branch operation based on release of waiting of the branch operation by the instruction issue stop signal.

4. The data processing device according to claim 1, wherein
the branch direction signal includes a branch request signal generated based on a program executed in the program execution section, an interrupt request signal output from an interrupt control section placed as a different block from the program execution section, and a system call generated based on a program executed in the program execution section.

5. The data processing device according to claim 1, wherein
when a plurality of peripheral devices to operate based on the operation direction signal are coupled to the program execution section, the peripheral device status notification signal becomes active when indicating that at least one of the plurality of peripheral devices is executing an operation.

6. The data processing device according to claim 1, wherein execution of a branch destination program is performed after an operation of a branch source program ends, the branch source program comprising instructions executed before the branch operation, and the branch destination program comprising a newly executed program after the branch operation.

7. The data processing device according to claim 6, wherein an operation of a first program is executed after an operation of a second program is completed by using the branch wait operation section, the second program being configured for execution on said data processing device and the first program being configured for execution on both said data processing device and another data processing device.

8. A control method of a data processing device, the method comprising:
supplying, by a program execution section, an operation direction signal to a peripheral device based on an executed program and executing, by the program execution section, a branch operation in response to a branch direction signal;
receiving, by a branch wait operation section, the branch direction signal and a peripheral device status notification signal indicating whether an operation performed in the peripheral device is being executed,
wherein the branch wait operation section outputs an instruction issue stop signal directing waiting of the branch operation to the program execution section when the branch direction signal is input during a period when the peripheral device status notification signal is active indicating that the operation in the peripheral device is being executed.

9. The control method of the data processing device according to claim 8, wherein the data processing device executes the branch operation after waiting of the branch operation is released.

10. The control method of the data processing device according to claim 8, wherein
when an occurrence of an exception of processing is notified from the peripheral device during a period when waiting of the branch operation is directed, the data processing device executes exception handling on the peripheral device before executing the branch operation based on release of waiting of the branch operation.

11. The control method of the data processing device according to claim 8, wherein
the branch direction signal includes a branch request signal generated based on a program executed in the data processing device, and an interrupt request signal output from an interrupt control section to control an interrupt request from another peripheral device.

12. A data processing device comprising:
a program execution section to supply an operation direction signal to a peripheral device based on an executed program and execute a branch operation in response to a branch direction signal; and
a branch wait operation section to receive the branch direction signal and a peripheral device status notification signal indicating whether an operation performed in the peripheral device is being executed,
wherein the branch wait operation section outputs an instruction issue stop signal directing waiting of the branch operation to the program execution section when the branch direction signal is input during a period when the operation in the peripheral device is being executed, and
wherein the program execution section executes the branch operation after waiting of the branch operation by the instruction issue stop signal is released.

13. The data processing device according to claim 12, wherein the program execution section comprises an instruction issue section, a primary instruction execution section and a branch instruction execution section, the instruction issue section selecting an instruction to be executed next based on a program and issues the selected instruction as an instruction issue signal to the primary instruction execution section and the branch instruction execution section.

14. The data processing device according to claim 13, wherein the instruction issue section receives branch direction signals comprising a branch request signal and an interrupt request signal and performs a branch operation that changes a program to be executed based on the branch request signal or the interrupt request signal.

15. The data processing device according to claim 13, wherein the instruction issue section receives an exception notification signal and an instruction issue stop signal, and wherein when the exception notification signal is input, the instruction issue section performs exception handling on processing that has notified the exception.

16. The data processing device according to claim 15, wherein when the instruction issue stop signal is input, the instruction issue section waits to issue an instruction based on the instruction issue stop signal, and
wherein the primary instruction execution section executes instructions other than a branch instruction which are issued by the instruction issue section, and wherein the primary instruction execution section outputs an operation direction signal that gives an operation direction to a coprocessor and a memory controller according to a kind of instruction, the coprocessor performing processing different from a central processing unit based on the operation direction signal that is output from the primary instruction execution section.

17. The data processing device according to claim 13, wherein the branch instruction execution section outputs a branch request signal that notifies an address of a branch destination program and execution of a branch instruction when an instruction output from the instruction issue section is the branch instruction, and wherein the branch request signal is transmitted to the instruction issue section and the branch wait operation section.

18. The data processing device according to claim 17, wherein execution of the branch destination program is performed after an operation of a branch source program ends, the branch source program comprising instructions executed before the branch operation, and the branch destination program comprising a newly executed program after the branch operation.

19. The data processing device according to claim 13, wherein the branch wait operation section receives the branch direction signal, the peripheral device status notification signal indicating whether an operation performed in the peripheral device is being executed, and an exception notification signal, wherein when the branch direction signal is input during a peripheral device processing period when the peripheral device status notification signal indicates that the operation in the peripheral device is being executed, the branch wait operation section outputs an instruction issue stop signal that directs waiting of the branch operation to the program execution section.

20. The data processing device according to claim 19, wherein the branch direction signal involves a branch request signal output from the branch instruction execution section and an interrupt request signal output from the interrupt control section, and
wherein the instruction issue stop signal directs waiting of the branch operation when the instruction issue stop signal is in an active state, and the instruction issue stop signal directs release of waiting of the branch operation when the instruction issue stop signal is in an inactive state.

* * * * *